May 5, 1925.
G. HORVATH
MILK CAN OR CONTAINER
Filed Nov. 23, 1922
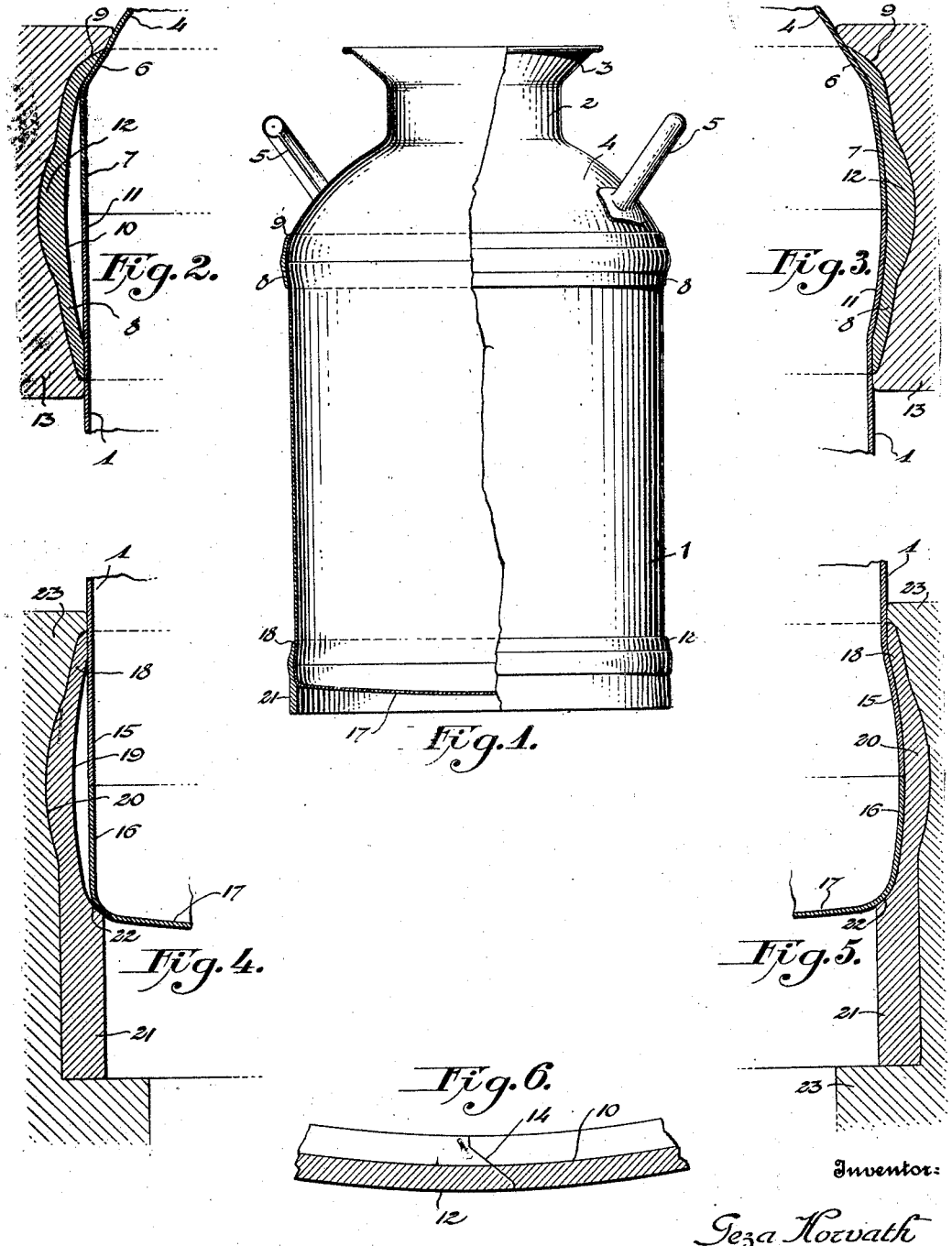
Inventor:
Geza Horvath
By
Attorney Patented May 5, 1925.

1,536,497

UNITED STATES PATENT OFFICE.

GEZA HORVATH, OF DETROIT, MICHIGAN.

MILK CAN OR CONTAINER.

Application filed November 23, 1922. Serial No. 602,712.

*To all whom it may concern:*

Be it known that I, GEZA HORVATH, a citizen of the United States of America, residing at Detroit, in the county of Wayne and State of Michigan, have invented certain new and useful Improvements in Milk Cans or Containers, of which the following is a specification, reference being had therein to the accompanying drawings.

This invention relates to milk cans, containers and other liquid holding receptacles, and my invention, in its broadest aspect involves a milk can, as a new article of manufacture; a method of making the milk can, and a reaming or forming instrumentality by which my method of manufacture may be put into practice. In this application I consider the construction of the milk can.

My invention aims to simplify the manufacture of milk cans, and other receptacles; reduce the cost incident to such manufacture; obviate the use of solder and such lead compounds that are poisonous or contaminating; eliminate cracks, crevices and such irregular surfaces in or on which matter may accumulate and render the can or receptacle unsanitary; provide a more durable can, and in general improve the art of can manufacture.

In the manufacturing of milk cans or other large liquid holding receptacles, it is the present practice to use large quantities of lead solder, so much indeed, that the cost of the solder and labor and time incident to its proper application is a large item in the expense of production. Then again, solder has an injurious effect on the milk placed in the can, and by making a can without solder, I have solved a problem which may completely change methods of manufacture now in vogue.

Protecting rings have also been soldered or otherwise secured on can bodies and I have found that spaces or air gaps are often left between the rings and a can body. Such spaces or air gaps weaken the can structures wherever they occur and should a ring be indented, cracked or broken any seam or joint, at or adjacent such fracture, is opened resulting in leakage. I have further found if such spaces or air gaps can be eliminated that the longevity of a can is materially increased. This is one of the things I have accomplished by my can construction wherein the walls of the can body are placed in direct contact with protecting rings, during the construction of a can, so that there is no possible chance whatsoever for spaces or air gaps to exist. Parts of my can are so intimately related that the structure as a whole takes on the solidity of a homogeneous mass and irrespective of rough handling the can cannot be injured or fractured to the extent of causing open seams and joints or any leakage from the can.

My invention further aims to provide a can or receptacle embodying superposed parts having confronting edges flared by internal pressure into frictional or intimate relation with concavo-convex protecting rings surrounding the can parts at the confronting edges. By distending the annular edges of the can parts uninterrupted smooth walls are formed, which require no tension other than that of tinning if the can is to receive such an interior finish, and in distending or flaring the can parts there is a positive anchoring or interlocking precluding all danger of such parts being separated when in use.

My invention will be hereinafter specifically described and then claimed, and reference will now be had to the drawings, wherein—

Figure 1 is a side elevation of a milk can or container, partly broken away and partly in vertical section;

Figs. 2 and 3 are enlarged detail sectional views of a top ring before and after being reamed to place can parts in engagement therewith;

Figs. 4 and 5 are similar views of a bottom ring or chime before and after having can parts secured thereto, and Fig. 6 is an enlarged horizontal sectional view of a portion of either the top or bottom ring showing a scarf joint.

The reference numeral 1 denotes a cylindrical can body or shell. This body or shell is rolled or otherwise formed from strong and durable sheet metal, preferably in the form of a strip having its ends brought together and welded or otherwise fixedly secured.

On what may be considered the upper end of the body or shell is a top piece, comprising a cylindrical neck portion 2, an annular mouth or funnel 3, a breast or bell shaped portion 4, and diametrically opposed handles 5. This top piece is of a conventional form with the exception that in its initial formation I provide the breast portion 4, at its large or lower end, with an annular inclined or beveled wall 6 and a straight or cylindrical wall 7. The edges of this last mentioned wall are adapted to be placed on the upper edges of the can body or shell 1, as best shown in Fig. 2.

Surrounding the upper edges of the can body or shell and the wall 7 of the top piece is a concavo-convex top ring 8 having an inturned annular feather edge flange 9 adapted to snugly fit on the inclined or beveled wall 6 of the top piece, a concave wall 10 against which the wall 7 and the upper annular wall 11 of the can body or shell are seated, and an annular exterior bellied portion 12 which circumferentially reinforces or lends thickness to the top ring. This ring is adapted to be placed in a suitable mold or holding member or device 13 and held about the confronting walls 7 and 11 while internal pressure is brought to bear against said walls to laterally expand or flare said walls until the same are seated on the concave wall 10 of the top ring. This is best shown in Fig. 3 and is accomplished by reaming, rolling, peening or otherwise pressing the walls 7 and 11 until it is expanded or distended against the top ring. On account of this top ring having end diameters less than an intermediate diameter of said top ring, it is obvious that the confronting ends of the shell 1 and the top piece are anchored together or inseparably united against lengthwise displacement, and with the top ring made from a piece of rolled metal having its ends joined by a scarf joint 14 welded or otherwise fixedly formed, lateral displacement of the walls 7 and 11, relative to each other, is practically impossible. In forcibly expanding the walls 7 and 11 against the top ring there is an intimate contacting relation between said walls and the ring, avoiding air gaps and spaces and eliminating any uneven or irregular surfaces in this portion of the can. The wall 7 is practically a continuation of the wall 11 and the inner walls of the top piece and can body or shell can be easily tinned or otherwise finished.

The can body or shell 1 has a lower annular wall 15 and placed in engagement with the annular edge of this wall is the upper edge of the annular wall 16 of a concavo-convex bottom piece 17. This bottom piece is pressed or otherwise formed to provide a cupped or dished bottom can part which may have its inner walls practically a continuation of the inner wall of the can body or shell.

Surrounding the walls 15 and 16 is a bottom ring 18 having an annular inner concave wall or seat 19, an annular exterior bellied portion 20, a bottom chime or supporting wall 21, and an anular inner shoulder 22 at the upper edge of the wall 21. This chime or supporting wall is of greater thickness than the concavo-convex bottom ring 18 so that the shoulder 22 may be formed as a supporting seat for the bottom piece with the wall 21 of sufficient depth to support the bottom wall of the can elevated relative to any surface supporting the can in an upright position.

With the bottom ring 18 placed in a suitable mold or device 23, as best shown in Figs. 4 and 5, the same instrumentality employed for flaring or distending the walls 7 and 11 of the upper portion of the can may be employed for flaring or distending the walls 15 and 16 into intimate contacting engagement with the annular concave wall or seat 19 of the bottom ring, so that the walls 15 and 16 will be practically a continuation of each other as shown in Fig. 5. By expanding the wall 16 of the bottom piece, the bottom piece is positively seated on the annular shoulder 22 of the chime or supporting wall 21 and the lower portion of the can is now ready to pass through a tinning operation. In this tinning operation tin will enter any interstices that may exist between the confronting edges of the can parts, but in expanding and distending the walls of the can parts the metal of said can parts is crowded towards one another so that the abutting edges of the can parts are practically sealed, more so when such parts receive a coat of tin imparting a smooth and sanitary interior finish to the entire can.

In practice, the parts of the container or receptacle are tinned before being assembled, especially those parts which are placed in intimate relation to form a joint or seam. It is therefore obvious that when the interior of the container or receptacle is tinned that such tinning operation practically renders the container or receptacle an integral or homogeneous structure. This is particularly true where seams or joints are welded throughout, in contradistinction to spot welding, and such thorough welding is resorted to wherever it is necessary to add strength and rigidity to parts of the container or receptacle that will be subjected to abuse.

What I claim is:—

1. A container comprising rings having concave walls, and superposed parts having alining edges seated on and secured to the concave walls of said rings, said rings having a belly in proximity to the confronting edges of said parts.

2. A container comprising superposed parts having abutting edges thereof flared, and rings uniting the flared edges of said parts to hold such parts, one as a continuation of the other, affording an uninterrupted inner wall.

3. As a new article of manufacture, a bottom ring for a receptacle having a cupped bottom piece with a wall adapted to be distended, comprising a chime wall, a concavo-convex wall above said chime wall, and a shoulder at the juncture of said walls on which said bottom piece is seated so that the wall of said bottom piece may be distended to have a diameter greater than the diameter of the inner chime wall and thus be snugly embraced by said concavo-convex wall.

4. A bottom ring as called for in claim 3 wherein the concavo-convex wall is of less thickness than said chime wall and has an exterior bellied portion.

5. A bottom ring as called for in claim 3, made from a rolled strip of material bent to ring form with its ends secured by a scarf joint.

6. Means for uniting receptacle parts comprising a concavo-convex ring against the concave wall of which relatively thin, abutting and flush receptacle parts may be forcibly flared and secured.

In testimony whereof I affix my signature in presence of two witnesses.

GEZA HORVATH.

Witnesses:
CHAS. W. STAUFFIGER,
KARL H. BUTLER.